Figure 2:
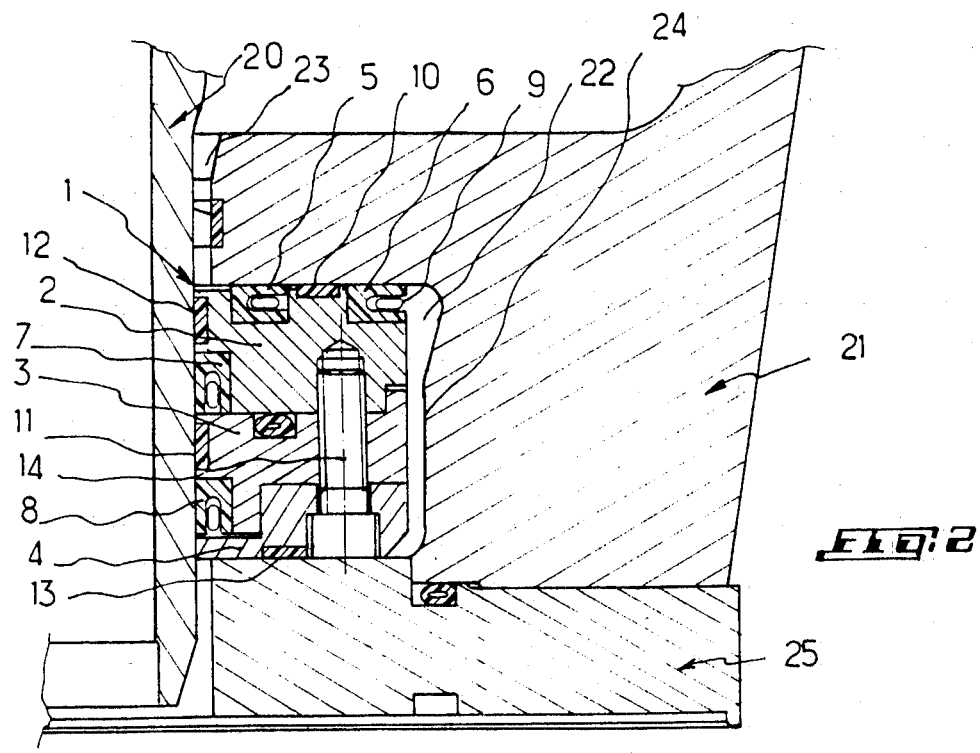

United States Patent [19]

Ghilardi et al.

[11] Patent Number: 4,576,387
[45] Date of Patent: Mar. 18, 1986

[54] ROTARY JOINT DEVICE WITH FLOATING SEAL RING FOR A CRYOGENIC FLUID

[75] Inventors: Jean P. R. F. Ghilardi, Montlignon; Rémi F. Forget, Breval, both of France

[73] Assignee: Entreprise d'Equipements Mecaniques et Hydrauliques (E.M.H.), France

[21] Appl. No.: 758,458

[22] Filed: Jul. 24, 1985

[30] Foreign Application Priority Data

Jul. 26, 1984 [FR] France .................................. 84 11901

[51] Int. Cl.[4] .......................... F16J 15/18; F16J 15/54
[52] U.S. Cl. ...................................... 277/176; 277/22; 277/177; 277/165; 277/193; 277/199; 277/205
[58] Field of Search ................ 277/165, 177, 192–194, 277/199, 205, 206 R, 22, 173–176

[56] References Cited

U.S. PATENT DOCUMENTS

| | | | |
|---|---|---|---|
| 2,690,360 | 9/1954 | Young | 277/177 X |
| 2,825,590 | 3/1958 | Sutherland | 277/165 |
| 3,094,335 | 6/1963 | Shenk | 277/174 X |
| 3,129,021 | 4/1964 | Willis et al. | 277/199 X |
| 3,186,724 | 6/1965 | Wheatley | 277/174 X |
| 4,121,840 | 10/1978 | Berg | 277/165 X |

FOREIGN PATENT DOCUMENTS 1196448   5/1959   France ................................ 277/165

Primary Examiner—Robert S. Ward
Attorney, Agent, or Firm—Steinberg & Raskin

[57] ABSTRACT

A device forming a rotary joint for a cryogenic fluid, comprising a stationary part and a rotary part mounted in rotatable relationship with the stationary part, the sealing means at the connection between the rotary part and the stationary part comprising a floating ring providing fluid-tightness through radial and face-bound engagements, respectively, wherein said floating ring consists of at least two annular members assembled together and formed with recesses housing the sealing gaskets without requiring any previous deformation of the latter therefor, the device being applicable in particular to ship loading and unloading systems.

7 Claims, 2 Drawing Figures

ROTARY JOINT DEVICE WITH FLOATING SEAL RING FOR A CRYOGENIC FLUID

The present invention relates generally and is essentially directed to an improved rotary or swivel joint device for a fluid, in particular a cryogenic fluid.

A known rotary or swivel joint device comprises a stationary part and a rotary part rotatably mounted in relation to the stationary part, the stationary and rotary parts comprising each one at least one corresponding duct adapted for the flow of the cryogenic fluid through the joint, fluid-tight means for the heat insulation of at least those walls of the joint which are contacted by the cryogenic fluid and which form the vital portions of the joint, such in particular as the walls located at the plane between the stationary part and the rotary part, in relation to the surrounding medium or space, said heat insulating means comprising at least one fluid-tight ring-shaped chamber arranged in coaxial relationship with the cryogenic fluid flow duct surrounding same radially outwards, said ring-shaped chamber being fluid-tightly closed or shut off by suitable sealing means.

According to the prior art, said sealing means at the connection between the rotary part and the stationary part and adjacent to the flow of the cryogenic fluid comprise a floating ring providing fluid tightness through radial and face-bound engagements, respectively, the fluid tightness being provided by an annular packing preferably formed with two lips. This floating ring offers the main advantage of being adaptable to the relative thermal contracting motions between the stationary part and the movable part as well as to the concentricity defects even of minor significance between such a stationary and movable parts thereby substantially reducing the stresses or strains on the sealing packings.

Such an annular sealing joint packing however is too bulky or massive so that the thermal stresses occurring in particular during the cooling down step are substantial and likely to result in a failure or damage.

A main object of the present invention is to remove the aforesaid inconvenience by improving the reliability of the system while retaining the principle of the floating ring providing fluid-tightness through radial and face-bound engagements, respectively. This technical problem is solved according to the invention by a device forming a rotary or swivel joint for a cryogenic lfuid and of the kind which is characterized in that the floating ring consists of at least two annular members assembled togbether and formed with recesses for housing or accommodating the packings providing fluid-tightness radially and face-wise without previously deforming same for that purpose.

The floating ring consists advantageously of three annular member assembled together by screws.

According to a particular characterizing feature of the present invention, the radial fluid-tightness and the face-bound fluid-tightness are each one achieved by at least one annular packing for instance formed with two lips. Thus the thermal stresses in particular during the cooling down operation will be reduced and the danger of damaging or impairing the sealing joint packings will be decreased.

Figure 1:
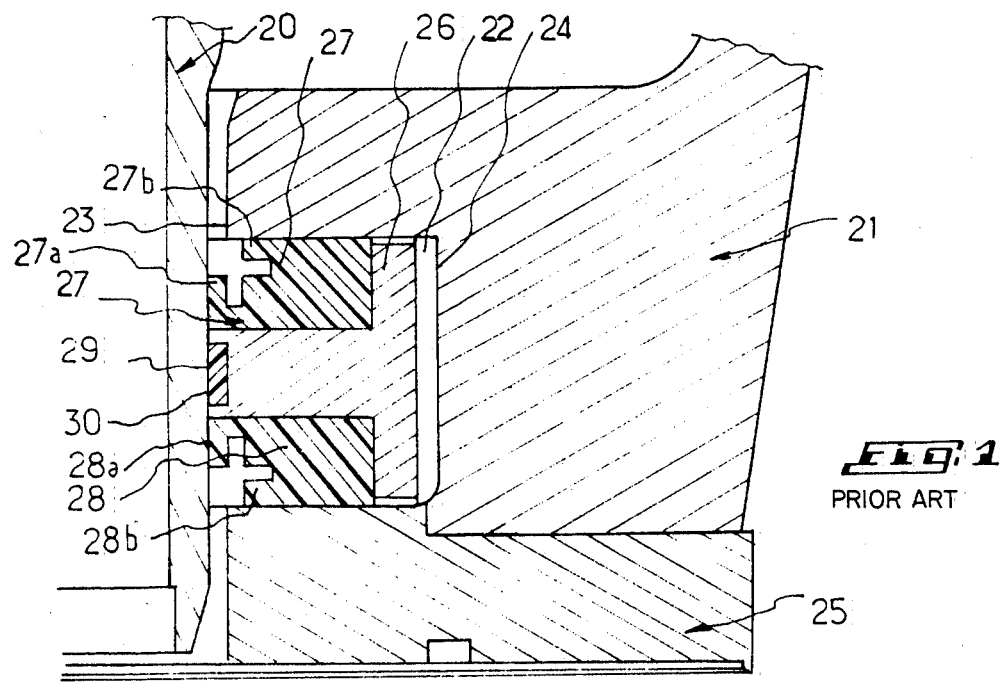

The invention will be better understood and further objects, characterizing features, advantages and details thereof will appear more clearly as the following explanatory description proceeds with reference to the accompanying diagrammatic drawings given by way of non-limiting example only illustrating a presently preferred specific embodiment of the invention and wherein:

FIG. 1 is a view in axial longitudinal half-section of an embodiment of a rotary joint for a cryogenic fluid according to the prior art; and FIG. 2 is an axial longitudinal half-section similar to that of FIG. 1 and showing the embodiment illustrated on FIG. 1 but improved according to the invention.

Referring to FIG. 1, the device forming a rotary or swivel joint for a cryogenic fluid according to the prior art comprises a rotary part 20 mounted in rotating relationship with the stationary part 21, fluid-tight means providing heat insulation to at least those walls of the joint which are contacted by the cryogenic fluid and which form the vital portions of the joint such as in particular the walls located at the plane between the stationary part and the rotary part in relation to the surrounding medium or space.

The heat insulating means comprise at least one annular chamber substantially filled with a heat insulating material and the fluid-tightness of which at the area between the rotary part 20 and the stationary part 21 is secured by the device shown.

As shown on FIG. 1, there is provided a stairway-like or stepped overlap preferably of the radially outer stationary portion 21 of the joint with respect to the end of the rotary portion 20 of the joint, this stairway-like or stepped overlap comprising two stairs-like portions 23, 24, the outermost stairs-like portions 24 being substantially closed by a ring-shaped member 25 so as to define an annular cavity 22 between the second step 24 and the end of the rotary part 20.

Within the annular cavity 22 is located an annular ring 26 having a T-shaped cross-sectional construction. The fluid-tightness is achieved by inserting into that T-shaped structure two double-lip seals or gaskets 27 and 28 located on either side of the leg of the T. Each lip 27a, 27b and 28a, 28b of each seal or gasket 27 and 28 which extend at right angles to each other thus provide the radial and face-bound fluid-tightness of the device.

A ring-shaped pad 29 provides for guiding the T-shaped ring 26 on the central tube 20.

Such seals or sealing gaskets however being relatively bulky or massive may possibly give rise to relatively high values of the thermal stresses they undergo in some cases of use, in particular during the cooling down operation thereby resulting in a failure or damage hazard. Such a hazard is alleviated through the embodiment according to FIG. 2 which shows an improvement to the device illustrated on FIG. 1.

Elements similar to those of FIG. 1 are designated by the same reference numerals.

The principle of the floating ring providing fluid-tightness through radial and face-bound engagements, respectively, has been retained. As seen, the floating ring 1 consists preferably of three annular members 2, 3, 4 assembled together by screws 14 for instance. The annular members 2, 3, 4 are formed with recesses serving the purpose of accommodating or housing the sealing gaskets without having to deform same therefor.

The radially and face-wise acting fluid-tightnesses are each one provided by at least one annular packing having two lips for instance, with U-shaped cross-sections and preferably at least two such packings are arranged in series in the direction of effectiveness of the fluid-tightness.

On FIG. 2 have been shown four annular double-lip packings of U-shaped cross-section 5, 6, 7, 8 positioned in recesses formed for that purpose in the annular members 2 and 3.

The lips are advantageously kept in pressed engagement with the corresponding contact surfaces while being spread or spaced apart preferably by means of an annular spring 9 located therebetween and consisting for instance either of a helical spring made in particular from a coiled flat strip or of a U-shaped leaf-spring.

According to another particular characterizing feature of the invention, the floating ring 1 is guided by at least three and preferably four annular pads 10, 11, 12, 13 as shown on FIG. 2. The pad 10 is advantageously arranged between both radially sealing gaskets 5 and 6 and the pad 11 is located between both face-engaging sealing gaskets 7 and 8.

Thus are achieved a perfect fluid-tightness of the annular cavity 22 as well as all the technical advantages previously described with respect to the improved embodiment forming the subject matter of the invention.

The invention is applicable to the cryogenic fluids as well as any type of fluids to be conveyed which give rise to thermal phenomena of contraction and expansion as well as to any system of which the concentricities between the stationary and movable parts may not be perfectly carried out.

The invention comprises all the means forming technical equivalents of the means described as well as their various combinations if same are carried out according to its gist and within the scope of the apended claims.

What is claimed is:

1. A device forming a rotary joint for a fluid, in particular a cryogenic fluid, comprising a stationary part and a rotary part rotatably mounted in relation to the stationary part, each one of the stationary and rotary parts comprising at least a corresponding duct adapted to the flow of the cryogenic fluid through the joint, fluid-tight means providing heat insulation of at least those walls of the joint which are contacted by the cryogenic fluid and which form the vital portions of the joints as in particular the walls located at the plane between the stationary part and the rotary part in relation to the surrounding medium, said heat insulating means comprising at least one fluid-tight annular chamber arranged in concentric relation to the cryogenic fluid flow duct surrounding same radially outwards, said annular chamber being closed in fluid-tight relationship by sealing means which at the connection between the rotary part and the stationary part include a floating ring providing fluid-tightness through radial and face-bound engagements, respectively, wherein the improvement consists in that said floating ring consists of at least two annular members assembled together and formed with recesses for accommodating the radially and face-wise acting sealing gaskets without any previous deformation of same for that purpose.

2. A device according to claim 1, wherein said floating ring consists of three annular pieces assembled together by screws.

3. A device according to claim 2, wherein the radially and face-wise acting fluid-tightnesses are provided each one by at least one annular sealing gasket formed with two lips.

4. A device according to claim 3, wherein the radially and face-wise acting fluid-tightnesses are provided each one by two annular double-lip sealing gaskets of U-shaped cross-sections arranged in series in the direction of effectiveness of the seal.

5. A device according to claim 3, wherein the lips of each sealing gasket are kept in pressed engagement with the corresponding contact surfaces while being held spread apart by means of an annular spring located therebetween.

6. A device according to claim 5, wherein said floating ring is guided by at least three annular pads.

7. A device according to claim 6, wherein said floating ring is guided by four pads one of which is arranged between both aforesaid radially acting sealing gaskets and the other one is located between both face-wise acting sealing gaskets.

* * * * *